Sept. 6, 1955 G. O. PUERNER 2,717,367

MOULDED COVER JACK ASSEMBLY

Filed Jan. 27, 1954 2 Sheets-Sheet 1

INVENTOR
George O. Puerner
BY
Nicholas Lang
ATTORNEY

Sept. 6, 1955  G. O. PUERNER  2,717,367

MOULDED COVER JACK ASSEMBLY

Filed Jan. 27, 1954  2 Sheets-Sheet 2

INVENTOR
George O. Puerner
BY
Nicholas Lang Jr.
ATTORNEY

United States Patent Office 2,717,367
Patented Sept. 6, 1955

2,717,367

MOULDED COVER JACK ASSEMBLY

George O. Puerner, Indianapolis, Ind., assignor to P. R. Mallory & Co., Inc., Indianapolis, Ind., a corporation of Delaware Application January 27, 1954, Serial No. 406,439

15 Claims. (Cl. 339—185)

The present invention relates generally to electrical connectors and/or jacks and has particular reference to barrier type devices including means and methods for waterproofing the same so as to allow the use thereof with associated equipment in submerged environments.

It is sometimes necessary to interconnect electrical devices and apparatus such as communication and audio equipment as well as potentiometers, rheostats, switches and meters confined within a control or junction box which may itself be in a submerged environment or atmosphere of high humidity. Any connection. moreover, to such latter apparatus, which is usually mounted on the interior wall of the aforesaid junction box, must be made in a manner so as to substantially preclude the inflow of liquid from gaining access to such submerged equipment and which would perhaps damage the same irreparably.

To prevent this, connections are made between such equipment by means of an electrical jack structure which may in turn be mounted on the interior wall of a control box or junction box. It is apparent, however, that the construction of such a jack must be of such nature that the water surrounding such a junction box will be prevented from gaining access thereto and influencing the equipment. Since each jack has an ingress aperture or hole adapted to mate with its corresponding plug section or component, the interior of such jack must be constructed in a manner which will prevent or block any flow of water seeping thereto from continuing and penetrating through said jack interior to the associated electrical equipment.

It is therefore a prime object of the present invention to provide a novel high humidity and water-resistant jack means for interconnecting electrical equipment and components whereby the said equipment will be allowed proper operation without being influenced by the moist surrounding environment.

It is another object of the present invention to provide a waterproof type of jack which is adapted to interconnect equipment with associated plug connectors and whereby a liquid, although penetrating said jack aperture, may be prevented from reaching said associated electrical equipment.

Another object of the present invention is to provide a barrier type jack constructed in a manner so as to allow waterproof operation of associated electrical equipment connected to said jack which is in turn connected to an associated plug.

Another object of the present invention is to provide an expensive and novel waterproof jack.

Still another object of the present invention is to provide a waterproof jack in which the construction is such as to enable the ready use of the same in a submerged environment.

Another object of the present invention is to provide a jack which is simple, strong and durable in construction.

Still another object of the present invention is to provide a simple, efficient and practical waterproof and/or barrier type jack for use in interconnecting associated electrical equipment.

Another object of the present invention is to provide a waterproof type jack which includes a plastic, molded shell fabrication and is novelly constructed and adapted for positively mounting and supporting a spring construction within said shell in a strong and essentially positively aligned manner while adapting the same for ready fabrication and manufacture.

The invention, in another of its aspects, relates to novel features of the instrumentalities described herein for teaching the principal object of the invention and to the novel principles employed in the instrumentalities whether or not these features and principles may be used in the said object and/or in the said field.

With the foregoing and other objects in view the invention consists in the construction, combination and arrangement of parts hereinafter described and illustrated in the drawings, in which.

Figure 7:
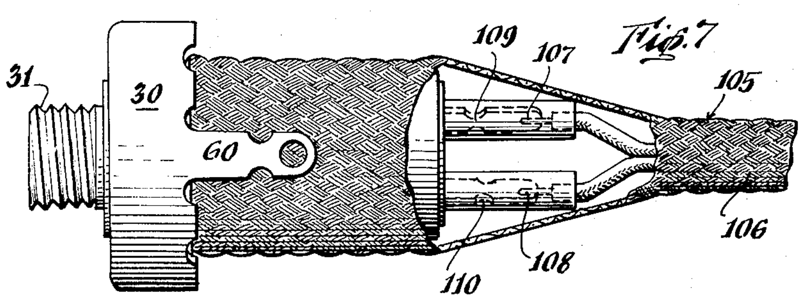
Figure 8:
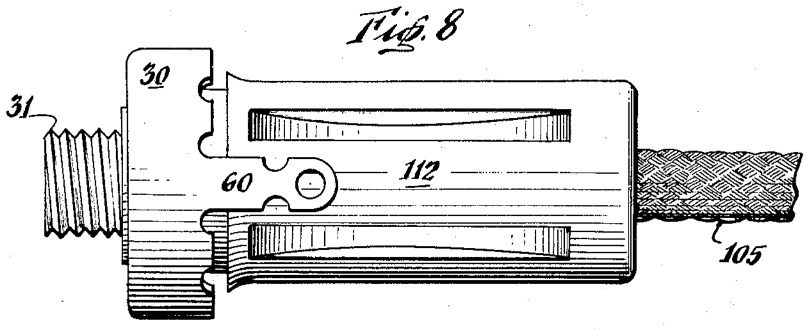

Fig. 7 is a modification of the embodiment of the invention shown above wherein a braided shield is placed over the waterproof jack and where the solder lugs are connected to a conductor whose leads are further protected by a moisture-proof enclosure, with said braided shield overlying the same and being connected to the shell of said jack; and Fig. 8 is a modification of the structure shown in Fig. 7 having an additional metal shield placed over the jack and braided shield structure.

Generally speaking, the present invention comprises a novel construction of a waterproof jack adapted for use with an accommodating plug structure. The waterproof jack essentially comprises a unitarily molded mica filled phenolic shell having preformed alignment slots cut longitudinally in both top and bottom inner walls thereof in a manner such that the top wall structure has its slots separated by means of a wider partition than the lower slot structure. As so constructed the inner side walls of the shell converge toward each other so that specially constructed resilient side spring frames preferably fabricated of silver plate copper alloy strips are adapted to slide within both the top slots and the lower slots to form a plug gripping means having a different angle at the top than at the bottom.

The frames of the resilient springs are adapted to penetrate through the back wall of the shell via a pair of slots cut therethrough essentially in the same axial plane as the slots formed in the inner wall of said shell. The frames include unitarily fabricated solder lugs which are adapted to pass through the slots in the back of said shell so as to accommodate and join the termini of associated conductors. The metals used therefor are the same as for the frames and are hot tinned for easy soldering. A spacer disc aids in the retention of the frame within the slots of the shell while at the same time a rubber sleeve having pockets therein surrounds the individual solder lugs so as to prevent any water from passing through the back wall of the shell.

Over the front end or collar of the shell an annular metal cap or cup having a threaded bushing structure is fitted. The side wall of the cup is scalloped so as to provide clutching teeth to retain the cap on the collar of the shell by crimping these teeth thereover. A unitarily constructed solder lug extends from this cap structure to be used for connecting a conductor. Inside the cap a rubber gasket and fibre washer surrounds the internal bushing opening. The construction as above explained and subsequently described in greater detail hereafter, is thus adapted to provide a waterproof type of jack capable of being used with cooperating electrical equipment so as to prevent the flow of water to said equipment.

Figure 1:
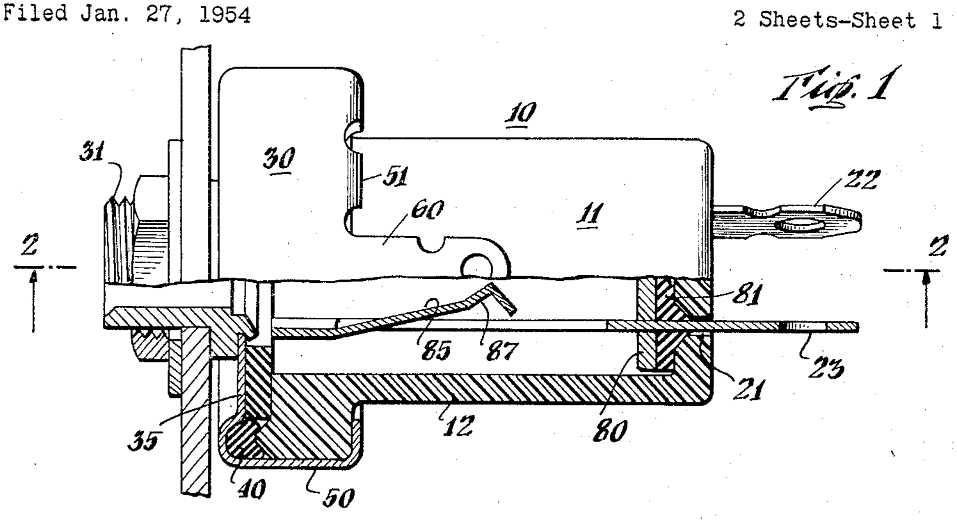
Fig. 1 is a side elevational view of an embodiment of the novel water-seal jack of the present invention as adapted to illustrate the relationship between the outer and internal sections thereof.
Figures 2, 3, 5, 6:
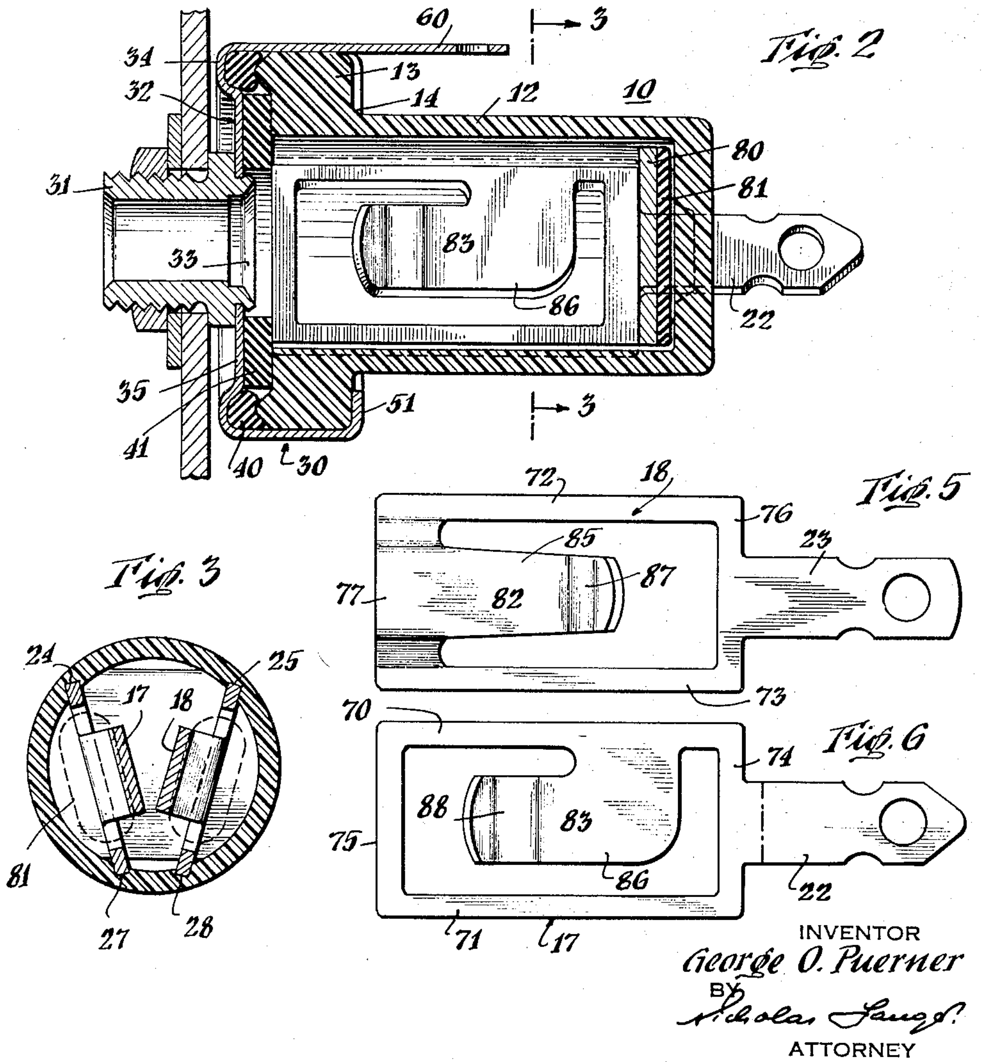
Fig. 2 is a longitudinal cross sectional view of an embodiment of the present invention as adapted to illustrate the assembled relationship of the various components in the waterproof jack construction thereof and as taken along line 2—2 of Fig. 1.
Fig. 3 is a cross-sectional view of the rear of the waterproof jack taken along line 3—3 of Fig. 2 and as adapted to show the novel waterproof internal rubber pockets surrounding the metal resilient springs of the jack.
Figs. 5 and 6 are illustrations of the individual resilient tip and sleeve springs utilized in the aforesaid invention of a waterproof jack and as shown in Fig. 4.
Figure 4:
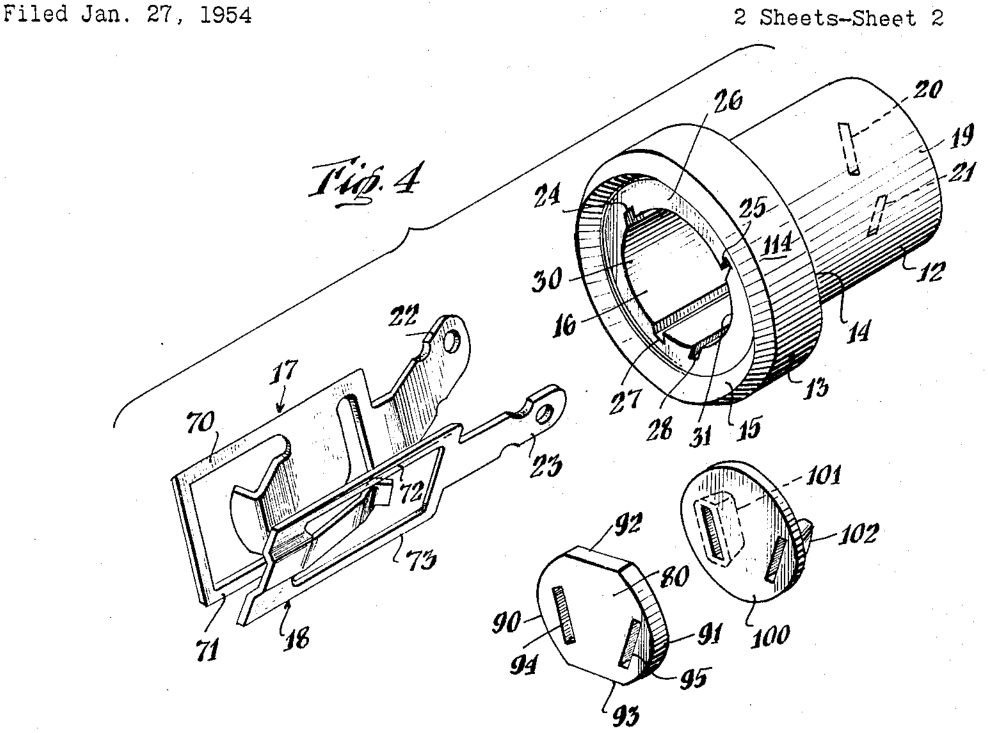
Fig. 4 is an illustrative view of the internal spring construction of the waterproof jack showing the V-shaped resilient spring tip and sleeve assembly.

Referring now to the drawings and more particularly to Figures 1, 2 and 4, there is shown a waterproof jack 10 having a unitarily molded, prefabricated shell structure 11 comprising a main cylindrical body portion 12 and an annularly configured collar portion 13 which is wider in diameter than the main body portion of the shell and which is interconnected thereto by means of a shoulder 14. In Fig. 4, the annular collar 13 is shown as comprising a neck portion having a circumferential side wall 14 and a tapered ridge or lip 15 extending therefrom. The shell comprises a front open-faced portion having a wide central aperture 16 through which a pair of resilient contact spring means 17 and 18 for making connection to the tip and sleeve of an associated plug is adapted to pass. The shell has an opposing end wall 19 which is substantially closed except for two slots 20 and 21 which are cut therethrough so as to allow solder lugs 22 and 23 of the said resilient tip and sleeve spring means 17 and 18 to pass therethrough and thus to be connected to outside connectors. The inside wall of the shell has cut therein a pair of guide slots 24, 25 disposed in the top half thereof, said slots having a wide ridge 26 separating them, and a pair of guide slots in the bottom half thereof, 27, 28 which slots are separated by a ridge 29 substantially narrower than the top as above stated. The guide slots between the top half and the bottom half of the side wall are interconnected by means of a pair of side ridges 30 and 31. The spring guide slots extend the entire length of the shell to end next the back wall thereof. The back wall of said shell is integrally molded to the annular side wall of the shell and has a pair of apertures, as stated, cut therethrough which apertures are angulated to receive the pair of solder lugs connected to the spring frames of the jack.

The cup structure 30 of the jack adapted to fit over the collar portion of said shell comprises a metal threaded bushing 31 staked to a stamped metal front surface 32. The center of the front surface has a circular aperture 33 substantially of the same diameter as the hole in the bushing which is to accommodate the diameter of the insertable plug. The front surface about the circular aperture comprises a circumferential raised ring portion 34 and a countersunk inner land portion 35 adapted to contain thereby about said bushing, if required, a disc-shaped rubber washer. The inner face of the countersunk center portion of the front surface is thus pushed inside the cap to form an annular groove between the cap side wall which is fabricated to extend back from the face of the cap. This inward groove also is adapted to accommodate a rubber gasket 40 between the walls of the groove. A fibre washer 41 is also adapted to be seated on said inner surface of said countersunk portion of the cup. As seen, the annular side wall 50 of the cap or cup extends on the collar of the molded jack shell and is adapted to fit thereon. The end of the side wall of the cap is scalloped to form a plurality of teeth 51 which, when said cap is fitted over the shoulder of the shell, are adapted to extend beyond said collar thereof so that they may be crimped along the shoulder and to firmly seat the cap on the shell. A solder lug 60 unitarily formed and connected to said cap extends backwardly in a plane parallel to the side wall of said shell but is spaced therefrom.

Figs. 4, 5 and 6 show the contact means for making contact between tip and shell of a cooperating plug for the jack. These means comprise resilient frame spring constructions including a pair of substantially rectangular configured spring frames 17 and 18. The spring frames comprise longitudinally extending side walls 70, 71, 72 and 73 made of thin strips of metal, which side walls are joined by means of thin end walls 74—77 as particularly shown in Figs. 5 and 6. An end wall of the resilient spring frames has individual solder lugs 22 and 23 integrally formed and connected substantially at the center thereof. The solder lugs are adapted to fit through their cooperating fibre washer 80 and rubber sleeve 81 prior to penetrating the back wall of said plastic molded shell.

One of the end walls parallel to and opposing said solder lugs may be bowed slightly in construction to aid in their resilience and may have integrally formed therewith and extending within the space surrounded by said frames, tongues or resilient springs 82 and 83 inclined inwardly away from said rectangular shells and toward their corresponding opposing frames. The two rectangular frame springs have a cradle-like configuration adapted to be held by slots falling back from the center open end of said plastic shell toward the closed end thereof. Each tongue portion of the resilient frame comprises a tapered inclined main section 85, 86 and V-shaped portion 87, 88 connected thereto by means of inclined side walls which thus form a contact ridge for electrically wiping and gripping the tip or shell of the accommodating plug which is insertable between the resilent frames.

The resilent frame structures are insertable within insulative spacer or washer 80 at the back end thereof. The insulative washer 80 may be constructed of a fibre disc having annular side walls 90, 91 and crosswise connecting flat top walls 92, 93. A pair of slots 94, 95 may be cut therethrough with said slots converging toward each other. The solder lugs connected to the resilient frames are fittable therethrough. A rubber sheath 81 having a thin annular face 100 and integrally joined pockets 101, 102 of a tapered construction is adapted to have said pockets penetrated by the solder lugs and to allow the pockets to adhere tightly about the same. Thus, when the resilient spring frames are slid within the slots formed in the inner wall of the shell so that the solder lugs pass through the apertures in the back wall thereof, the spring structure is adapted to be maintained and positively aligned within said slots and to be supported at the front and back of the shell in an extremely resilient yet tightly fitting manner.

In the assembly of the waterproof jack, above described, the internal assembly comprising the rectangular resilient frames have their individual solder lugs pass through the fibre spacer. The thin rubber sheath and pockets are then passed over the ends of the solder lugs so that a rubber layer essentially surrounds the flat surface of the spacer disc and the legs of solder lugs. The leg ends of the solder lugs, in assembly, are then forced against the thin closed end wall of the rubber pockets so that they are pushed therethrough. Next, the inner spring assembly is slid along the slots formed in the face of and the inside side wall of the molded shell until the solder lugs pass through the apertures in the back wall thereof. Finally the cap, including the inside gasket and fibre washer and having the centrally connected outside threaded bushing, is fitted over the shoulder of the molded shell and the teeth formed by the scalloped end of the cap, are crimped against the shoulder to tightly clamp the same thereto. Further, in fitting the jack to any panel, a rubber gasket (not shown) may be externally provided to surround the bushing.

In Figs. 7 and 8, modifications of the structure above disclosed are shown, wherein additional protection may be afforded to the devices. As seen in Fig. 7, the solder lugs of the jack are connected to an external conductor having a braided sheath or sleeve 106. The connections 107, 108 thus made are protected by plastic hollow tube 109, 110 covering the individual lugs. Braided sheath or sleeve 106 is passed over the cap and plastic shell of the jack described in the other figures. The braided sheath is passed under the cap prior to crimping the same over the shoulder of the shell. Thus, the braided sheath is also tightly clamped within said cap on said shoulder of said jack shell.

In Fig. 8, an additional protecting metal or aluminum can 112 is placed over the braided sleeve construction shown in Fig. 7 and allows for electrical shielding of the jack, and may be used additionally where such shielding is desired.

The invention of the waterproof jack hereinabove described is merely illustrative of its manner and mode of operation and construction and the invention is not to be restricted in scope thereto but is to take its breadth rather from the claims here appended.

What is claimed is:

1. A jack comprising a plastic moulded shell including an annular side wall having a plurality of converging slots extending along the length thereof, a substantially closed back wall, an open end opposite said back wall, a pair of contact springs, each having a surrounding integral supporting frame, said frames having solder lugs penetrating said back wall and being held in said slots along said annular wall the length thereof, and a cap over said shell for closing said open end, said cap having a central aperture adapted to allow a plug to pass therethrough and to be tightly gripped by said frames.

2. A waterproof jack comprising an integrally moulded plastic shell including a main body portion and a neck portion, said neck portion being connected to said main body portion by means of a shoulder, a back wall for said plastic shell being substantially closed save for a pair of slots penetrating therethrough and converging toward each other, said main body portion including a plurality of longitudinally extending alignment slots formed therein, an open end for said shell placed opposite said back wall at the front thereof, a pair of contact springs, each having an integrally formed surrounding supporting framework including extending solder lugs centrally connected thereto at the back of said shell, said solder lugs adapted to pass through said slot apertures in said back wall so as to converge said frames in accordance with the direction of said slots, said frames further being held in said slots of said main body portion, and a cap structure having toothed gripping means integrally formed at an end thereof for closing said open end, said cap adapted to fit over said neck of said jack with said teeth thereof adapted to close over said shoulder to clamp the same firmly thereto, said cap having a central aperture adapted to allow a connector plug to pass therethrough so as to be gripped by said converging frames included within said plastic moulded shell of said jack.

3. A waterproof jack comprising a unitarily moulded plastic shell, said shell being hollow and having a cylindrical body portion with an annular side wall, a back wall thereto being closed except for a pair of narrow converging slots penetrating therethrough, the opposite end of said shell being open, a collar section of a wider diameter connected to said open end of said body portion of said shell, a pair of contact springs supported in the wall of said body portion, said springs having solder lugs connected thereto adapted to penetrate said back wall through said slots therein, and a cup fitting over said collar of said shell, and means for clamping said cup over said collar to tightly grip the same, said cup having an aperture adapted to receive an associated plug to be gripped by the contact springs in said jack.

4. A waterproof jack comprising a unitarily moulded plastic shell, said shell being hollow and having a cylindrical body portion with an annular side wall, a back end thereto being substantially closed except for a pair of narrow converging slots penetrating therethrough, the opposite end from said back end of said shell being substantially open, a collar section of wider diameter connected to said open end of said body portion of said shell, a pair of rectangular frame contact springs having the centers thereof open and supported in the wall of said body portion, said springs having solder lugs integrally connected thereto adapted to penetrate said back wall through said slots therein, and a cup fitting over said collar of said shell, and means for clamping said cup over said collar to tightly grip the same, said cup having an aperture adapted to receive an associated plug to be gripped by the contact springs in said jack.

5. A waterproof jack comprising a unitarily moulded plastic shell, said shell being hollow and having a cylindrical body portion with an annular side wall, said wall having a plurality of slots, a back wall connected to said shell being substantially closed except for a pair of narrow converging slots penetrating therethrough, the end of said shell opposite said closed end being substantially open, a hollow collar section of a wider diameter connected to said open end of said body portion of said shell, a pair of tip and sleeve contact frames supported in the opposing slots of said wall of said body portion, said springs having integrally formed solder lugs connected thereto at the center of each frame adapted to penetrate said back wall through said slots therein, a cup fitting over said collar of said shell, and means for clamping said cup over said collar to tightly grip the same, said cup having an aperture adapted to receive an associated plug to be gripped by the contact springs in said jack.

6. A waterproof jack comprising a unitarily moulded cylindrical plastic shell, said shell being centrally hollow and having a body portion with an annular side wall, a back wall connected at an end thereof being substantially closed except for a pair of narrow converging slots penetrating therethrough, an end opposite said wall of said shell being substantially open, a collar section of a wider diameter connected to said open end of said body portion of said shell by means of a shoulder, a pair of contact springs supported in the wall of said body portion, said springs having solder lugs connected thereto adapted to penetrate said back wall through said slots therein, a cup fitting over said collar of said shell, and integrally formed teeth means connected to said cup for clamping said cup over said collar to tightly grip the shoulder of said shell, said cup having an aperture adapted to receive an associated plug to be gripped by the contact springs in said jack.

7. A waterproof jack comprising a unitarily moulded cylindrical plastic shell, said shell being centrally hollow and having a cylindrical body portion with an annular side wall, said side wall having a plurality of slots therein, a back wall connected at an end thereof being substantially closed except for a pair of narrow converging apertures penetrating the thickness thereof, the opposite end of said shell being substantially open, a collar section of a wider diameter connected to said open end of said body portion of said shell by means of a shoulder, a pair of contact tip and sleeve springs of frame configuration supported in the wall slots of said body portion, said springs having centrally extending solder lugs connected thereto for penetrating through said back wall slots, a metal cup fitting over said collar of said shell, and scalloped end means on said cup for clamping said cup over said collar along said shoulder to tightly grip the same, said cup having an aperture adapted to receive an associated plug to be gripped by the contact springs in said jack.

8. A jack comprising a plastic moulded shell having a main body portion and an interconnected wider neck portion, a back wall substantially closed save for a pair of slots penetrating the thickness thereof, an open end to said shell at a point opposite said back wall, said open end having an annular central aperture, a pair of rectangular spring frames held within said main body portion of said shell, said frames having a pair of solder lugs each adapted to pass through the back thereof through said slots of said back-wall, and a cap for closing said open end, said cap having an aperture concentric with said central aperture of said shell and adapted to allow a connecting plug to pass therethrough so as to be gripped by said frames.

9. A jack comprising a mica filled phenolic moulded shell having a main body portion underlying a plurality of slots, a wider neck portion having a central aperture, said neck and shell being interconnected by a shoulder, a back wall substantially closed save for a pair of converging slots entirely penetrating the thickness thereof connected to said shell, an open end for said shell at the end furthest from said back wall, said open end having an annular central aperture aligned with said neck aperture, a pair of rectangular metal spring frames held within said slots of said main body portion of said shell, said frames further having a pair of solder lugs each adapted to pass through the back of said shell through the slots thereof so as to converge the frames within said shell, and a metal cup for closing said open end, said cup having an aperture concentric with said central aperture of said shell and adapted to allow a connecting plug to pass therethrough so as to be gripped by said converging frames.

10. A jack comprising a mica filled molded shell having a main body portion underlying a plurality of slots, a wider neck portion having a central aperture, said neck and shell being interconnected by a shoulder, a back wall substantially closed save for a pair of converging slots entirely penetrating the thickness thereof connected to said shell, an open end for said shell at the end furthest from said back wall, said back wall having an open end aligned with said neck aperture, a pair of rectangular spring frames held within said slots of said main body portion of said shell, said frames further having a pair of solder lugs integrally joined thereto, each adapted to pass through the back of said shell through the slots thereof so as to converge and maintain the frames of said shell, and a metal cup gripping the said shell on the outside thereof for closing said open end, said cup having an aperture concentric with said aperture of said shell and adapted to allow a connecting plug to pass therethrough so as to be gripped by said converging frames.

11. A barrier type jack comprising a unitarily moulded plastic shell having a hollow cylindrical main body portion and an interconnected wider neck portion having a central aperture, a back wall substantially closed save for a pair of narrow slots penetrating the thickness thereof, an open end to said shell opposite said back wall, said open end having an annular central aperture aligned with said neck aperture, a pair of rectangular spring frames held within said main body portion of said shell, said frames having a pair of solder lugs each adapted to pass through the back thereof through said slots of said back wall, and a cap for closing said open end, said cap having a solder lug connected thereto and a bushing concentric with said central aperture of said shell and adapted to allow a connecting plug to pass therethrough so as to be gripped by said frames.

12. A jack comprising a plastic moulded shell having a main body portion and an interconnected wider neck portion, a back wall substantially closed save for a pair of slots penetrating the thickness thereof, an open end to said shell at a point opposite said back wall, said open end having an annular central aperture, a pair of rectangular spring frames held within said main body portion of said shell, each of said frames having a solder lug adapted to pass through the back thereof through said aperture, a cap for closing said open end, said cap having a solder lug and an aperture concentric with said central aperture of said shell, an electrical conductor having a pair of terminals, one of said terminals being individually connected to one of said first solder lugs, said connections being covered by separate covers, and a braided sheath of said conductor clamped by said cap and placed over said main body portion of said jack and said connections covered by said covers.

13. A jack comprising a plastic moulded shell having a main body portion and an interconnected wider neck portion, a back wall substantially closed save for a pair of slots penetrating the thickness thereof, an open end to said shell at a point opposite said back wall, said open end having an annular central aperture, a pair of contact springs, each having a surrounding integrally supporting frame held within said main body portion of said shell, each of said supporting frames having a solder lug adapted to pass through the back thereof through said slots formed therein, a cap for closing said open end, said cap having a solder lug and an aperture concentric with said central aperture of said shell, an electrical conductor having a pair of individual terminals, one of said terminals being individually connected to one solder lug connected to each of said contact spring frames, said individual connections being covered by separate tubes, a braided sheath of said conductor clamped by said cap placed over said main body portion of said jack and said connections covered by said tubes, and a metal shield placed over the braided sheath covering said main body portion of the shell.

14. A jack comprising a shell having an annular side wall, a substantially closed back wall, an open end opposite said back wall, a pair of contact springs, each having a surrounding integral supporting framework, alignment slots extending longitudinally along said annular side wall, said slots adapted to retain said contact springs thereby, and a cap adapted to fit over said shell for closing said open end thereof, said cap having a central aperture adapted to allow a plug to pass therethrough and to be gripped by the contact springs within said framework.

15. A jack comprising a plastic, molded shell including a main body portion and an interconnected wider neck portion, said body portion having a plurality of longitudinal alignment slots formed therein, a substantially closed back wall connected to said main body portion of said shell, said back wall having a pair of slots penetrating therethrough and converging toward each other, an open end for said main body portion, a pair of contact springs surrounded by integrally supporting spring frames which have length and side walls, said contact springs thus being placed within the space of said frames and being connected to one wall in each, solder lugs connected to an end of said frames and passing through said pair of slots of said back wall to be supported thereby, said frames further being held within said alignment slots of said shell, and a cup for closing said open end of said shell, said cup having a central aperture adapted to allow a connecting plug to pass therethrough and to be gripped by said frames.

References Cited in the file of this patent

UNITED STATES PATENTS

| | | |
|---|---|---|
| Re. 20,033 | Hudson | July 14, 1936 |
| 530,066 | Cartwright | Nov. 24, 1894 |
| 1,103,991 | Murray | July 21, 1914 |
| 1,170,190 | Ravlin | Feb. 1, 1916 |
| 1,841,736 | Jones | Jan. 19, 1932 |
| 2,196,313 | Loursen | Aug. 9, 1940 |
| 2,457,488 | Penfold | Dec. 28, 1948 |